United States Patent [19]

Heidrich

[11] Patent Number: 4,686,868
[45] Date of Patent: Aug. 18, 1987

[54] SOUNDPROOFED GEAR BOX

[76] Inventor: Günther Heidrich, Ortwang 38, 8978 Burgberg-BRD, Fed. Rep. of Germany

[21] Appl. No.: 871,096

[22] Filed: Jun. 5, 1986

[30] Foreign Application Priority Data

Jun. 7, 1985 [DE] Fed. Rep. of Germany ....... 3520501

[51] Int. Cl.[4] ............................................. F16H 57/02
[52] U.S. Cl. ................................. 74/606 R; 74/421 R
[58] Field of Search ......................... 74/606 R, 421 R

[56] References Cited

U.S. PATENT DOCUMENTS

| | | | |
|---|---|---|---|
| 1,010,976 | 12/1911 | Sundh | 74/606 R |
| 2,237,958 | 4/1941 | Hansen et al. | 74/606 R |
| 2,600,912 | 6/1952 | Olson | 74/421 R |
| 2,936,591 | 5/1960 | Leipert | 74/606 R |
| 3,133,451 | 5/1964 | Thomas | 74/606 R X |
| 3,348,430 | 10/1967 | Polzin | 74/606 R |
| 3,897,693 | 8/1975 | Garman et al. | 74/606 R X |
| 4,100,821 | 7/1978 | Geiger | 74/606 R |
| 4,122,730 | 10/1978 | Weiland | 74/606 R |

FOREIGN PATENT DOCUMENTS

| | | | |
|---|---|---|---|
| 1226429 | 10/1966 | Fed. Rep. of Germany | 74/606 R |
| 2153258 | 8/1972 | Fed. Rep. of Germany | . |
| 2221804 | 11/1972 | Fed. Rep. of Germany | . |
| 2839938 | 3/1980 | Fed. Rep. of Germany | 74/606 R |
| 3217180 | 3/1983 | Fed. Rep. of Germany | . |
| 520346 | 3/1955 | Italy | 74/606 R |
| 191996 | 1/1923 | United Kingdom | . |
| 809371 | 2/1959 | United Kingdom | 74/606 R |

OTHER PUBLICATIONS

Basedow, Gunter, "Das Reduzieren von Gerauschen an stufen losen Getrieben," Maschinenmarkt 86:51 (1980) p. 1010.

Primary Examiner—Thomas F. Callaghan
Attorney, Agent, or Firm—Silverman, Cass, Singer & Winburn, Ltd.

[57] ABSTRACT

A soundproofed gear box, in particular a toothed wheel gear box with moving mechanical parts connected with a housing over bearing carriers, whereby the housing is provided with mounting feet. The bearing carrier (5, 6) is only connected with the area of the housing remote from the mounting feet (20).

8 Claims, 5 Drawing Figures

SOUNDPROOFED GEAR BOX

FIELD OF THE INVENTION

The present invention concerns a soundproofed gear box, in particular a transmission gear box.

BACKGROUND OF THE INVENTION

The acoustic energy generated by rotating moving mechanical parts together with their bearings is transmitted in the form of airborne and structure-borne noise by the housing in which these mechanical elements are accommodated. In this process, some of this acoustic energy is directly transmitted as airborne acoustic energy, whereas the remainder, which is usually the greater part, is transmitted through the structure to the foundation supports of the mechanical assembly concerned. This structure-borne acoustic energy generates airborne acoustic energy in turn, as it is transmitted from the floor into the room.

The application of continuously more severe regulations aimed at restricting noise levels have obliged machinery designers to adopt designs characterized by especially efficient soundproofing.

The following methods of soundproofing are known to practitioners of the state of the art:
  Friction soundproofing at the interfaces or mating faces of the various components, resulting in an increase of the transitional resistance;
  Supplementary soundproofing of moving mechanical parts as well as of the walls of housings by the application of one or several coatings of soundproofing material, such as sound deadening or sandwich materials, by lining particular recesses and hollow spaces with soundproofing material as well as by the use of special vibration absorbers;
  Internal or frictional soundproofing of the materials themselves, which is not applicable to metal components.

Ways are known of enhancing the dynamic rigidity of components by adopting thick-wall designs, thus providing a dimensionally and vibrationally stable structure whose energy flow paths are as short as possible.

The purpose of the present invention is to provide a simple way of effectively improving soundproofing.

SUMMARY OF THE INVENTION

The advantage of the present invention lies in that it provides an extremely long structure-borne acoustic path from the point of sound generation to the point of transit into the foundation, such that the amplitude of the acoustic energy generated will be substantially reduced along this long path as a result of the internal friction of the soundproofing material.

In a further embodiment of the present invention, the bearing carrier assembly may be connected only to the upper part of the housing in a unit in which the housing consists of a lower part with mounting feet together with an upper part.

The bearing carrier may be formed of two longitudinal members arranged at a distance from one another and divided in parts arranged above one another, each of the lower parts being connected to one another by means of cross members.

It is also possible for the bearing carrier to comprise two parts arranged at a distance from one another, each of these two parts being individually attached only to the upper part of the housing.

The bearing carrier assembly and/or the bearing carrier parts may in this case be fastened to the upper part of the housing by means of screws.

The upper part of the housing is preferably provided with recesses open towards the outside in which the screws are accommodated so as to be easily accessible from the outside.

In a further embodiment of the present invention, both the lower and upper parts of the housing may be provided with pairs of double walls and the internal cavities between them are filled with soundproofing material.

In yet a further embodiment of the present invention, lock bolts may be fitted in the lower part of the housing provided with double walls, whereby the lock bolts engage in bores in the bearing carrier assembly so as to be easily seen for inspection purposes, without the need to readjust new parts each time.

The present invention will now be elucidated with the help of embodiments and examples illustrated in the attached drawings, where:

DESCRIPTION OF THE PREFERRED EMBODIMENTS

Figure 1:
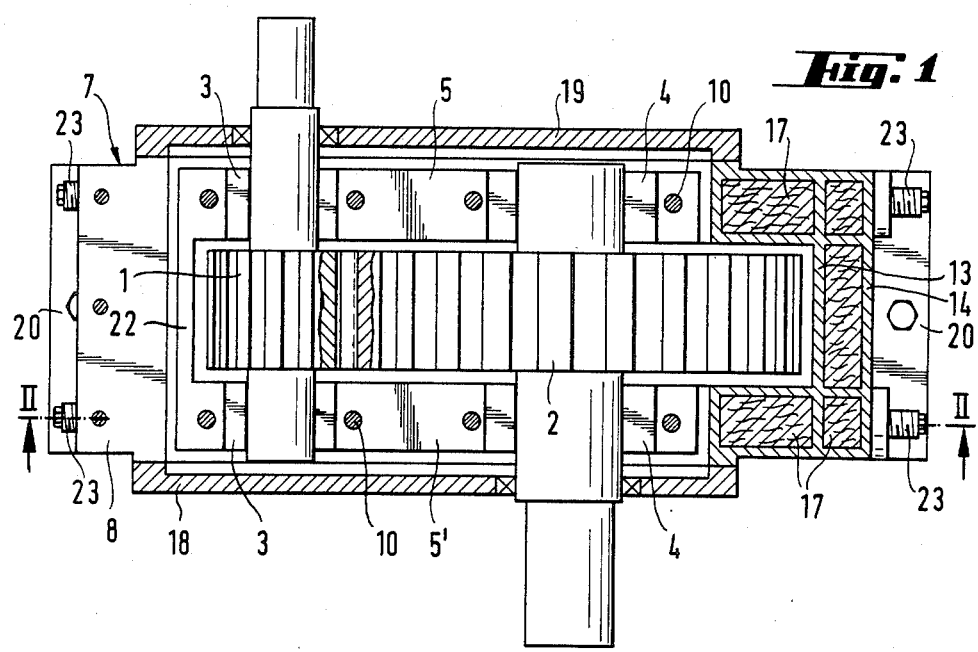
FIG. 1 shows a top view of a spur gear set according to the cross section I—I in FIG. 2.
Figure 2:
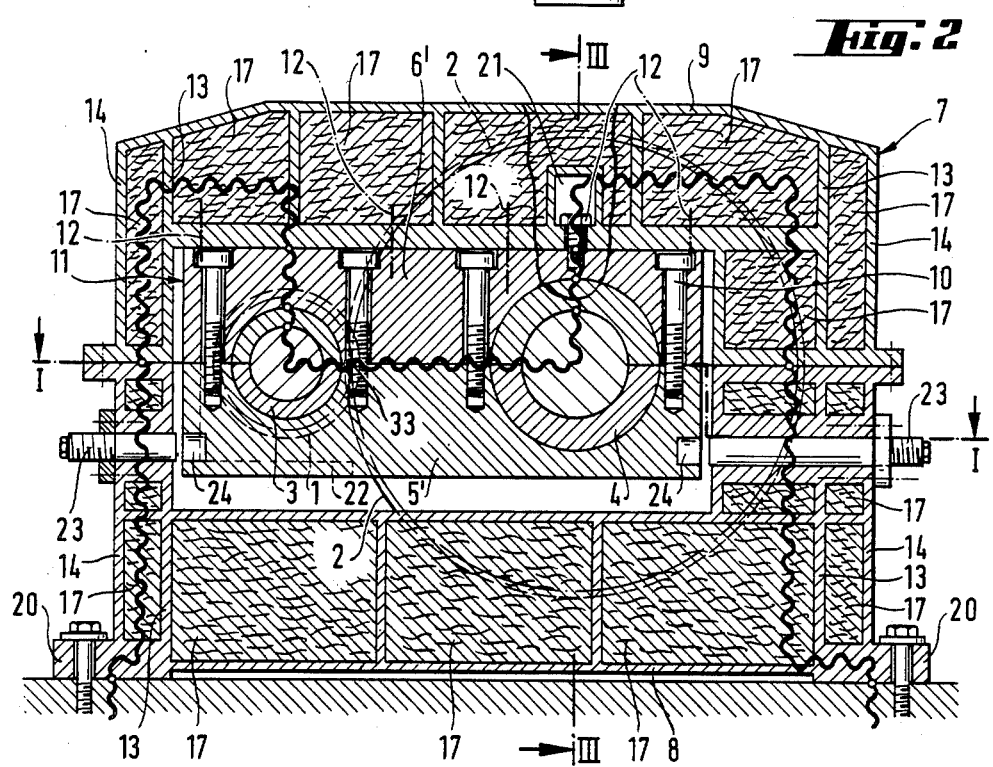
FIG. 2 shows a view of the gear set along a line II—II in FIG. 1.
Figure 3:
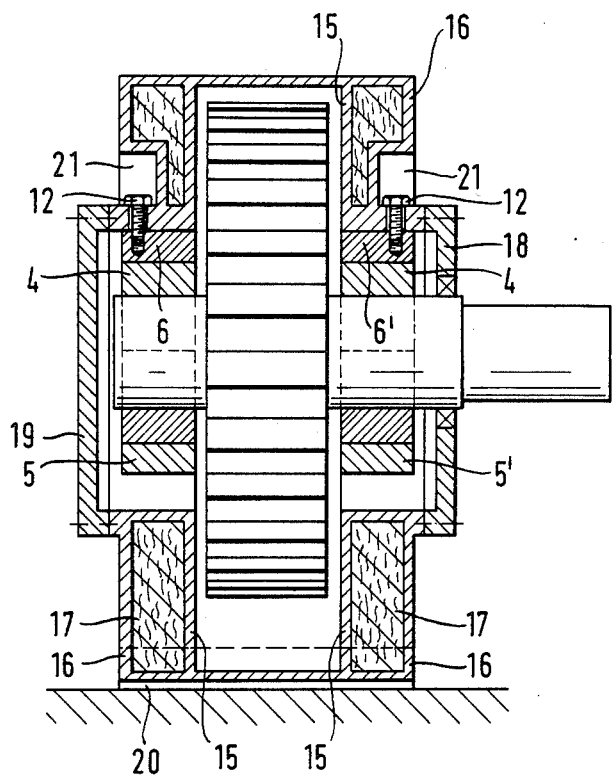
FIG. 3 shows a view of the gear set along a line III—III in FIG. 2.

The spur gear set shown in FIGS. 1-3 consists essentially of a pair of rotating gear wheels 1 and 2 which are supported in plain bearings 3 and 4. These plain bearings are supported in longitudinal bearing carriers which are arranged parallel and at a distance from one another. All of these mechanical components are accommodated in a housing assembly 7 consisting of a lower and of an upper part 8 and 9 respectively. The bearing carrier parts 5 and 6 and/or 5' and 6' are fastened to one another by means of screws. This arrangement provides a bearing carrier assembly 11 which is fastened to the upper housing part 9 only by means of the screws 12. The housing 7 is provided with double walls 12 and 13 and/or 15 and 16 which are arranged roughly parallel to the corresponding longitudinal and transverse walls of the housing 7, as can be seen from FIGS. 2 and 3. The double walls 13, 14 and 15, 16 form internal cavities in the upper and lower parts of the housing (9, 8) which are in turn filled with highly efficient soundproofing material (17).

The housing 7 is provided with covers 18, 19 as shown in FIGS. 1 and 3. These covers serve to prevent the lubricating oil from escaping from the inside of the housing. The lower part of the housing 8 is provided with feet 20 which are attached to the bottom of the housing. As can be seen in FIG. 3, the upper part of the housing 9 is provided with recesses open towards the outside which insure easy access to the screws 12.

The lower bearing carriers 5, 5' of each of the bearing carrier assemblies 11 shown in FIG. 1 and 2 can be permanently attached to one another by means of the connecting walls 22, according to FIG. 2.

To allow the transmission to be inspected, stop screws 23 are provided in the lower part of the housing 8, as shown in FIG. 2, which are inserted in the threaded bores 24 in the bearing carrier parts 5, 5', for example, and serve to secure the bearing carrier assembly 11 in the housing 7 in all directions for an inspection of the gear set.

Figure 4:
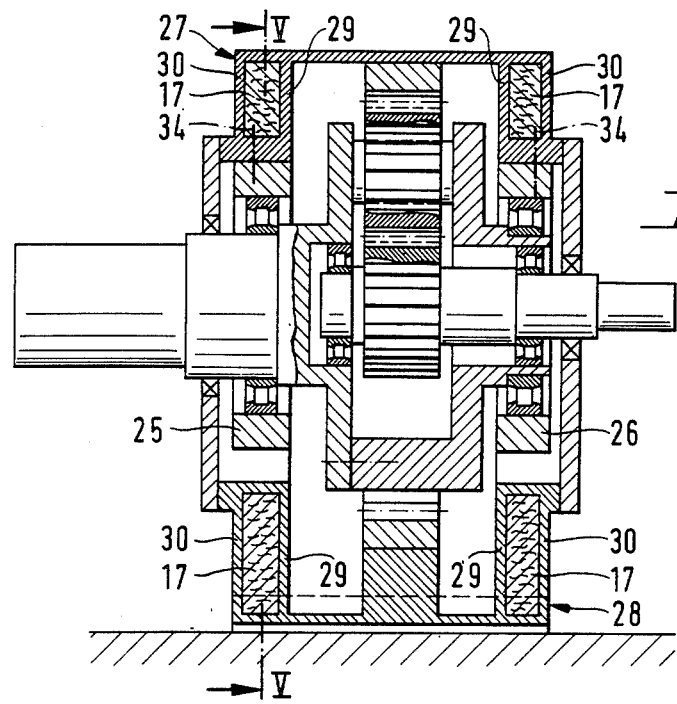
FIG. 4 shows a longitudinal cross section of a planetary gear set.
Figure 5:
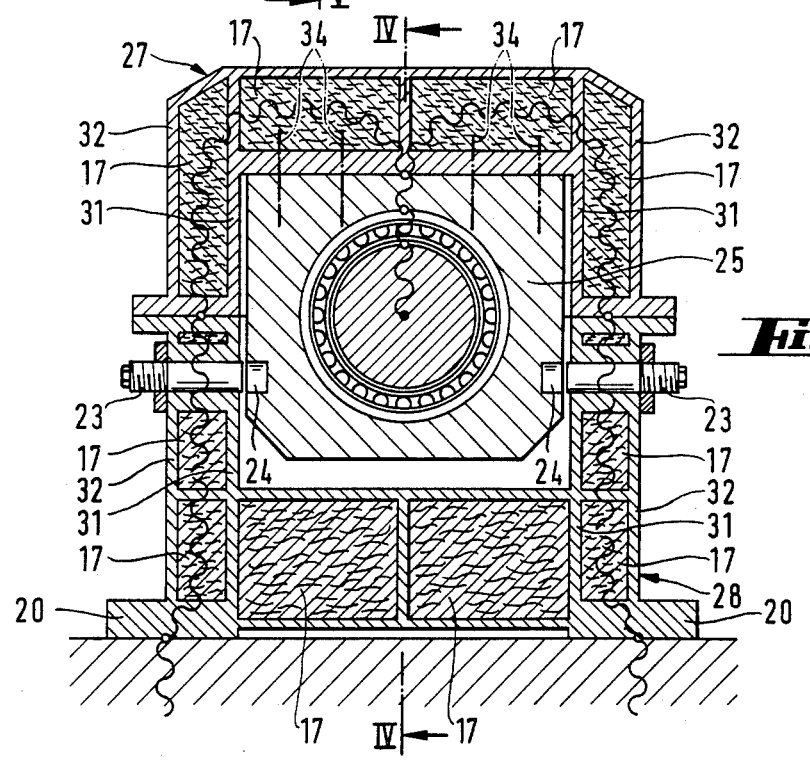
FIG. 5 shows a view of the gear box along a line V—V in FIG. 4.

An ordinary planetary gear set is shown in the embodiment shown in FIGS. 4 and 5. This planetary gear set is surrounded by a housing comprising an upper part 27 and a lower part 28 which is provided with feet 20 for fastening purposes. The planetary gear set, whose design is of the familiar type, is supported in two longitudinal bearing carriers 25 and 26 arranged at a distance from one another. As shown in FIGS. 4 and 5, these longitudinal bearing carriers 25 and 26 are only fastened to the upper part of the housing 27 by means of screws 34.

As can be seen in FIGS. 4 and 5, the housing upper part 27 and the lower part 28 are provided with double walls 29, 30 and 31, 32 which form internal cavities filled with soundproofing material 17.

Stop bolts 23 are provided for the purposes of an inspection of the planetary gear set, which can be inserted in the bores 24 in a similar way to the design according to FIG. 2. In that way, the longitudinal bearing carriers 25 and 26 can be properly adjusted in the course of an inspection of the transmission, thus obviating the need for any subsequent adjustment.

The present invention concerns not only toothed gear transmissions but the housings of other mechanical equipment incorporating either rotary or reciprocating moving parts can also be configured according to the design which is the subject of the present invention, such as the bearing supports of electric motors, turbines, compressors, pumps or layshafts, should this be necessary in order to meet noise level regulations. The mounting feet 20 can be arranged for the unit to be suspended from the upper part of the housing 9 and/or 27, if necessary.

The mode of operation of the present invention will now be described in more detail: in the case of the spur gear transmission according to FIGS. 1-3, noise is mainly generated as a result of the meshing of the gear wheels 1 and 2 according to FIG. 2 at point 33. From here, the vibrational energy is transmitted over the structure of the gear wheels, shafts, bearings and bearing carriers to the housing walls, as shown by the wave lines in the drawings. It is here that the vibrations are damped in the arrangement according to the present invention, essentially as the result of three means:

The natural frequency is shifted between a non-soundproofed structure and a structure soundproofed according to the present invention.

The input impedance is raised as a result of the high structural stiffness resulting from the incorporation of double walls 13, 14, 15 and 16 and the heavy mass of soundproofing material with which they are filled.

Reduction of the structure-borne noise over a lengthy sound transmission path, as can be seen from the wave lines in FIG. 2, whereby the noise level is reduced by the internal friction of the soundproofing material. By the same token, a planetary gear transmission can also be provided with a lengthy sound transmission path, as is shown by the wave lines in FIG. 5.

A further improvement of soundproofing can be achieved by providing the bearings with internal damping, especially in the embodiment shown in FIGS. 1-3, where the lubrication film of the plain bearings 3 and 4 are treated in this way. The soundproofing can be even further enhanced by inserting an intermediate layer, such as a seal or similar, to provide increased frictional damping at the interfaces between the various components.

These are shown in FIGS. 2 and 5 as the coupling points in the structural noise flow path indicated in the drawings by a small circle, for example, at the interfaces between the bearings 3, 4 and the bearing carrier parts 5, 6, 5' and 6'; between the bearing carrier parts 5, 6, 5' and 6' and the upper part of the housing 9 and between the upper part of the housing 9 and the lower part 8, as well as between the housing 7 and its mounting base; and finally, by the application of one or several layers of soundproofing to the webs of the gear wheels 1 and 2.

Apart from its high level of soundproofing, the design according to the present invention offers the following additional advantages:

The precision-machined bearing bores in the bearing carriers 5 and 6, and/or 25 and 26, can be drilled separately without the housing. This simplifies this stage of the machining and saves costs.

In both embodiments, the complete gear set or just the upper part can be removed by removal of the upper part of the housing 9 or 27, whereby the presence of the recesses 21 provides excellent access to the screws 12.

The use of double wall construction provides the entire housing not only with high dynamic stiffness but gives it a high level of static rigidity as well. This enables deformation of the housing as a result of forces and torques impinging on it to be avoided and this makes for enhanced functional mechanical reliability of the unit.

The present invention thus provides the advantage of providing a low cost and effective way of substantially reducing the acoustic energy generated in an assembly comprising mechanical components in rotary or reciprocol movement, by incorporating heavy soundproofing inside the housing of the assembly.

I claim:

1. A soundproofed gear box, in particular a transmission gear box with moving mechanical parts, which are enclosed over a plurality of bearing carriers by a housing comprising a first portion which is provided with mounting feet, and a second portion mating with said first portion, said bearing carriers (5, 6, 5', 6', 25 and 26) being only connected with said second portion of said housing (9, 27) and are remote from the portion provided with said mounting feet (20), providing a lengthy sound transmission path from the bearing carriers to the mounting feet.

2. A gear set according to claim 1, wherein the housing further comprises a lower part provided with mounting feet and an upper part, characterized in that the bearing carrier (11) as an assembly is only attached to the upper part (9) of the housing.

3. A gear set according to claim 2, characterized in that the bearing carrier (11) comprises two longitudinal members arranged at a distance from one another, each said longitudinal member being divided into an upper and a lower part arranged one above the other (5, 6, and/or 5', 6'), the lower parts (5', 6') being connected to one another by means of cross members (22).

4. A gear set according to claim 2, characterized in that the bearing carrier comprises two longitudinal members arranged at a distance from one another (25, 26), said longitudinal members being individually attached only to the upper part (27) of the housing.

5. A gear set according to claim 2, characterized in that the bearing carrier assembly (11) and/or the bearing carrier parts (25, 26) are fastened to the upper part of the housing (9, 27) by means of screws (12, 34).

6. A gear set according to claim 5, characterized in that the upper part of the housing (9) is provided with recesses (21) open towards the outside in which the screws (12) are accomodated.

7. A gear set according to claim 1, characterized in that the housing (8, 9, 27 and 28) is provided with pairs of double walls (13, 14; 15, 15; 29, 30; and 31, 32) and that the internal cavities between them are provided with soundproofing material (17).

8. A gear set according to claim 2, characterized in that lock bolts (23) are provided in the lower part of the housing (8) provided with pairs of double walls, whereby the lock bolts engage in bores (24) in the bearing carrier assembly (11) and/or in the bearing carriers (25, 26).

* * * * *